US006976142B1

(12) United States Patent
Schober

(10) Patent No.: US 6,976,142 B1
(45) Date of Patent: Dec. 13, 2005

(54) METHOD AND SYSTEM TO PROVIDE SIMULTANEOUS ACCESS BY MULTIPLE PIPELINES TO A TABLE

(75) Inventor: Richard L. Schober, Cupertino, CA (US)

(73) Assignee: Agilent Technologies, Inc., Palo Alto, CA (US)

( * ) Notice: Subject to any disclaimer, the term of this patent is extended or adjusted under 35 U.S.C. 154(b) by 358 days.

(21) Appl. No.: 10/431,974

(22) Filed: May 7, 2003

(51) Int. Cl.[7] .............................................. G06F 13/14
(52) U.S. Cl. ..................................................... 711/169
(58) Field of Search ........................ 711/147, 150, 169

(56) References Cited

U.S. PATENT DOCUMENTS

| 6,839,794 B1 * | 1/2005 | Schober ...................... 710/316 |
| 2003/0041185 A1 * | 2/2003 | Creta et al. ..................... 710/5 |
| 2005/0058130 A1 * | 3/2005 | Christ et al. ................ 370/389 |

* cited by examiner

Primary Examiner—Kevin L. Ellis

(57) ABSTRACT

According to a first aspect of the present invention, there is provided a method to receive a request from one of a plurality of pipelines to read a data record from a memory location within a first copy of a table. The method also includes a determination that there was a request to read the same memory location within a previous cycle. The method further includes the retrieval of a current version of the data record requested.

50 Claims, 14 Drawing Sheets

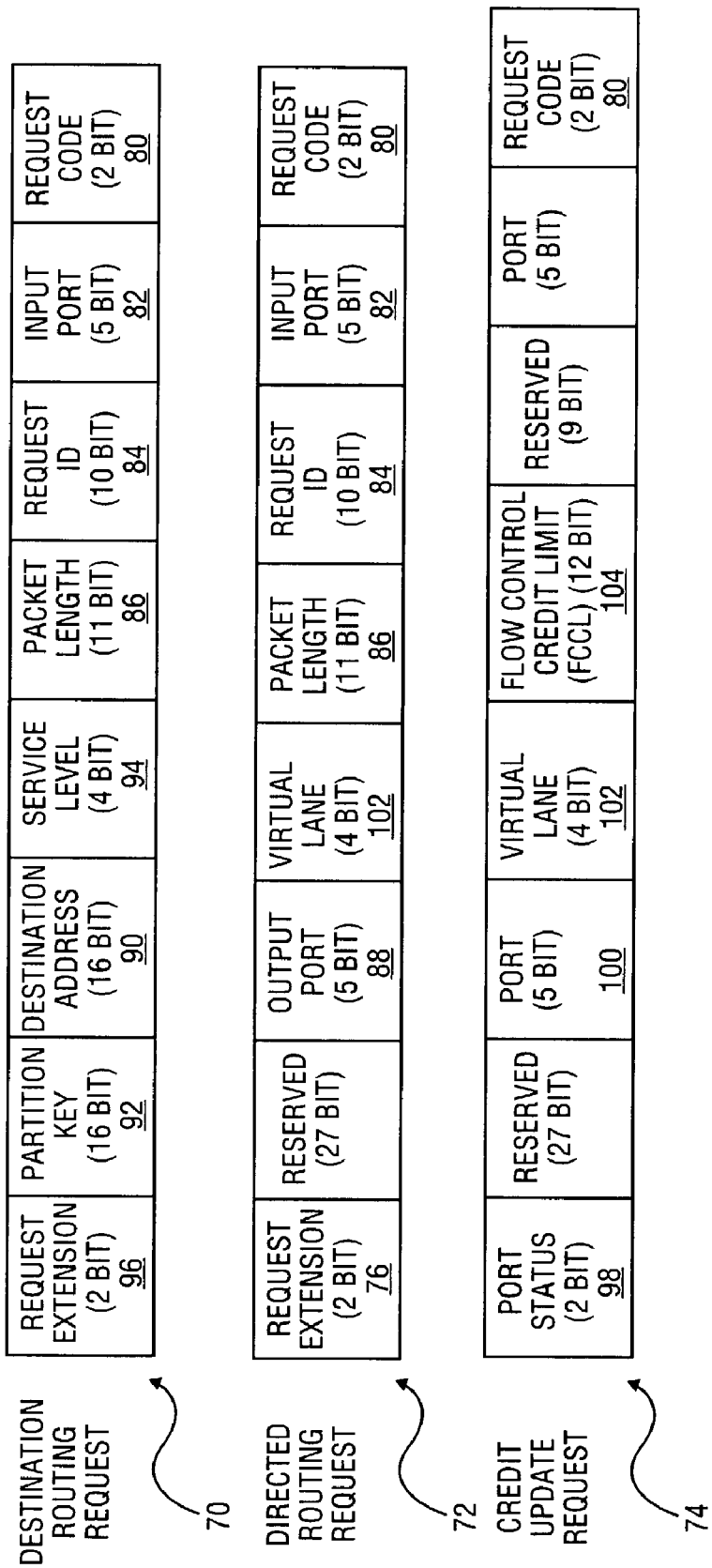

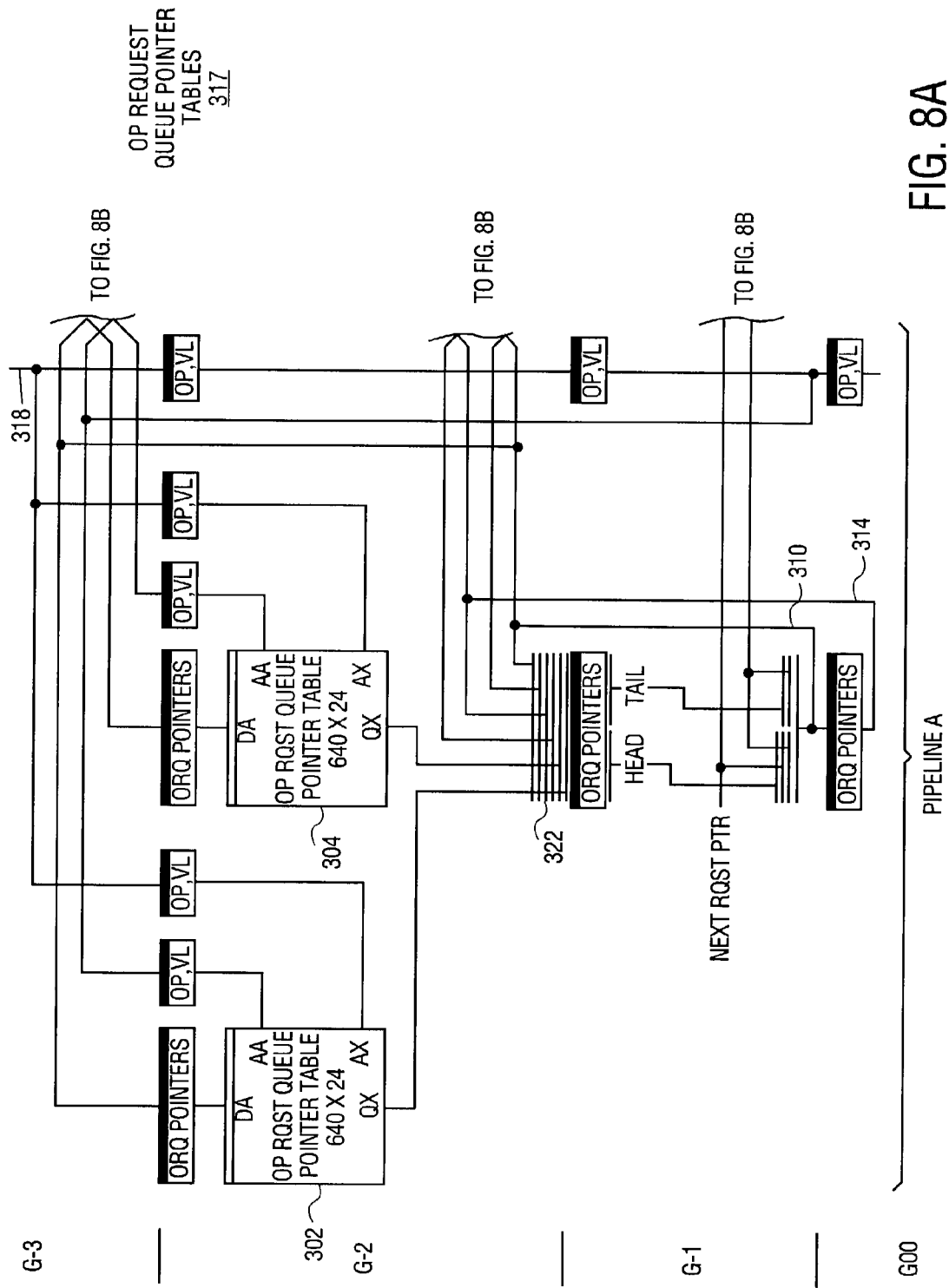

METHOD AND SYSTEM TO PROVIDE SIMULTANEOUS ACCESS BY MULTIPLE PIPELINES TO A TABLE

FIELD OF THE INVENTION

The present invention relates generally to the field of data communications and, more specifically, to a method and system for providing simultaneous access to a table within a memory.

BACKGROUND OF THE INVENTION

Existing networking and interconnect technologies have failed to keep pace with the development of computer systems, resulting in increased burdens being imposed upon data servers, application processing and enterprise computing. A number of computing technologies implemented to meet computing demands (e.g., clustering, fail-safe and 24×7 availability) require increased capacity to move data between processing nodes (e.g., servers), as well as within a processing node between, for example, a Central Processing Unit (CPU) and Input/Output (I/O) devices.

With a view to meeting the above described challenges, a new interconnect technology, called the InfiniBand™, has been proposed for interconnecting processing nodes and I/O nodes to form a System Area Network (SAN). This architecture has been designed to be independent of a host Operating System (OS) and processor platform. The InfiniBand™ Architecture (IBA) is centered around a point-to-point, switched IP fabric whereby end node devices (e.g., inexpensive I/O devices such as a single chip SCSI or Ethernet adapter, or a complex computer system) may be interconnected utilizing a cascade of switch devices. The InfiniBand™ Architecture is defined in the InfiniBand™ Architecture Specification Volume 1, Release 1.0, released Oct. 24, 2000 by the InfiniBand Trade Association. The IBA supports a range of applications ranging from back plane interconnect of a single host, to complex system area networks, as illustrated in FIG. 1 (prior art). In a single host environment, each IBA switched fabric may serve as a private I/O interconnect for the host providing connectivity between a CPU and a number of I/O modules. When deployed to support a complex system area network, multiple IBA switch fabrics may be utilized to interconnect numerous hosts and various I/O units.

Within a switch fabric supporting a System Area Network, such as that shown in FIG. 1, there may be a number of devices having multiple input and output ports through which data (e.g., packets) is directed from a source to a destination. Such devices include, for example, switches, routers, repeaters and adapters (exemplary interconnect devices). Where data is processed through a device, it will be appreciated that multiple data transmission requests may compete for resources of the device. For example, where a switching device has multiple input ports and output ports coupled by a crossbar, packets received at multiple input ports of the switching device, and requiring direction to specific outputs ports of the switching device, compete for at least input, output and crossbar resources.

In order to facilitate multiple demands on device resources, an arbitration scheme is typically employed to arbitrate between competing requests for device resources. Such arbitration schemes are typically either (1) distributed arbitration schemes, whereby the arbitration process is distributed among multiple nodes, associated with respective resources, through the device or (2) centralized arbitration schemes whereby arbitration requests for all resources is handled at a central arbiter. An arbitration scheme may further employ one of a number of arbitration policies, including a round robin policy, a first-come-first-serve policy, a shortest message first policy or a priority based policy, to name but a few.

The physical properties of the IBA interconnect technology have been designed to support both module-to-module (board) interconnects (e.g., computer systems that support I/O module add in slots) and chasis-to-chasis interconnects, as to provide to interconnect computer systems, external storage systems, external LAN/WAN access devices. For example, an IBA switch may be employed as interconnect technology within the chassis of a computer system to facilitate communications between devices that constitute the computer system. Similarly, an IBA switched fabric may be employed within a switch, or router, to facilitate network communications between network systems (e.g., processor nodes, storage subsystems, etc.). To this end, FIG. 1 illustrates an exemplary System Area Network (SAN), as provided in the InfiniBand Architecture Specification, showing the interconnection of processor nodes and I/O nodes utilizing the IBA switched fabric.

SUMMARY OF THE INVENTION

According to a first aspect of the present invention, there is provided a method to receive a request from one of a plurality of pipelines to read a data record from a memory location within a first copy of a table. The method also includes a determination that there was a request to read the same memory location within a previous cycle. The method further includes the retrieval of a current version of the data record requested.

According to a second aspect of the invention, there is provided a queue system management table to manage resource requests within an arbiter associated with an interconnect device. The queue system management table includes a plurality of memories, associated with the arbiter, each of the plurality of memories to maintain a copy of the queue system management table. The queue system management table also includes a plurality of read and write ports to access data records in the queue system management table. Moreover, the queue system management table includes a plurality of data bypasses to provide access to the most current copy of a data record within the queue system management table.

BRIEF DESCRIPTION OF THE DRAWINGS

The present invention is illustrated by way of example and not limitation in the figures of the accompanying drawings, in which like references indicate similar elements and in which:

FIG. 3 illustrates exemplary packet transfer requests and an exemplary credit update request.

FIGS. 8A–8B provide a pipestage representation of the functioning of the OP-VL management table according to an exemplary embodiment of the invention.

DETAILED DESCRIPTION

A method and system to provide simultaneous access by multiple pipelines to a table utilized by an arbiter are described. In the following description, for purposes of explanation, numerous specific details are set forth in order to provide a thorough understanding of the present invention. It will be evident, however, to one skilled in the art that the present invention may be practiced without these specific details.

Today, ASIC designers may use a memory compiler to generate on-chip memories. Memory compilers are widely available for single-port and dual-port memories. However, memory compilers which generate memories with more than two ports are not widely available. Hence, ASIC designers must utilize multiple copies of dual-port memories to emulate memories with three-or-more ports. For example, a single write/dual read (1W2R) memory may be emulated simply with two 1W1R memories. Both memories are written simultaneously with the same data, at the same address, thereby creating two copies of the same information. Each copy may be read independently. In the exemplary embodiment of the invention, emulation of 2W2R memories is necessary. Emulation of 2W2R memories is provided by four separate memories, where each memory maintains a copy of a table, and each memory is simultaneous accessible by two separate pipelines.

Allowing simultaneous access to a memory location (e.g., data record) is advantageous in that delays in accessing records within the table are reduced.

For the purposes of the present invention, the term "interconnect device" shall be taken to include switches, routers, repeaters, adapters, or any other device that provides interconnect functionality between nodes. Such interconnect functionality may be, for example, module-to-module or chassis-to-chassis interconnect functionality. While an exemplary embodiment of the present invention is described below as being implemented within a switch deployed within an InfiniBand architectured system, the teachings of the present invention may be applied to any device having an associated memory.

Figure 1:
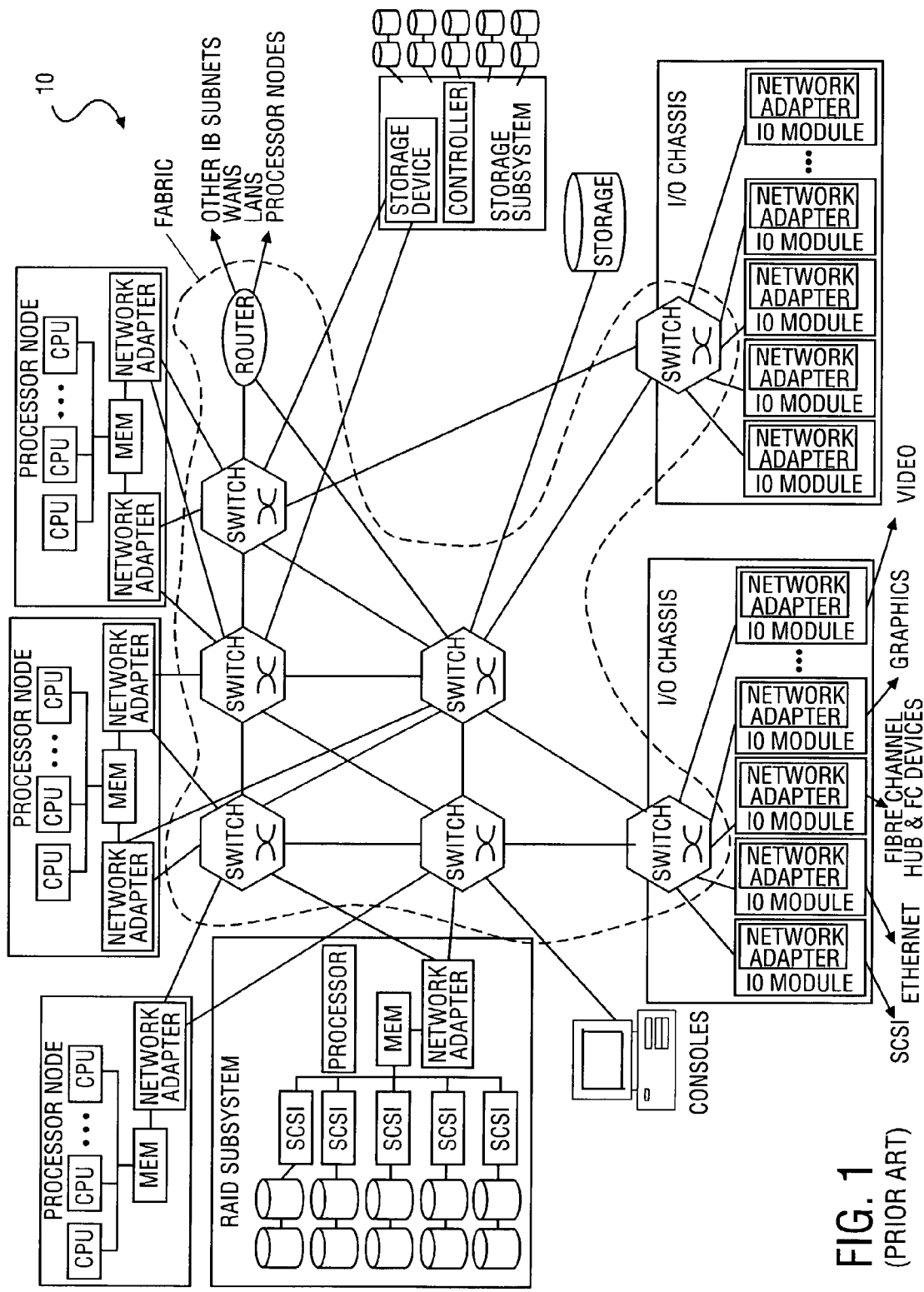
FIG. 1 is a diagrammatic representation of a System Area Network, according to the prior art, as supported by a switch fabric.
Figure 2A:
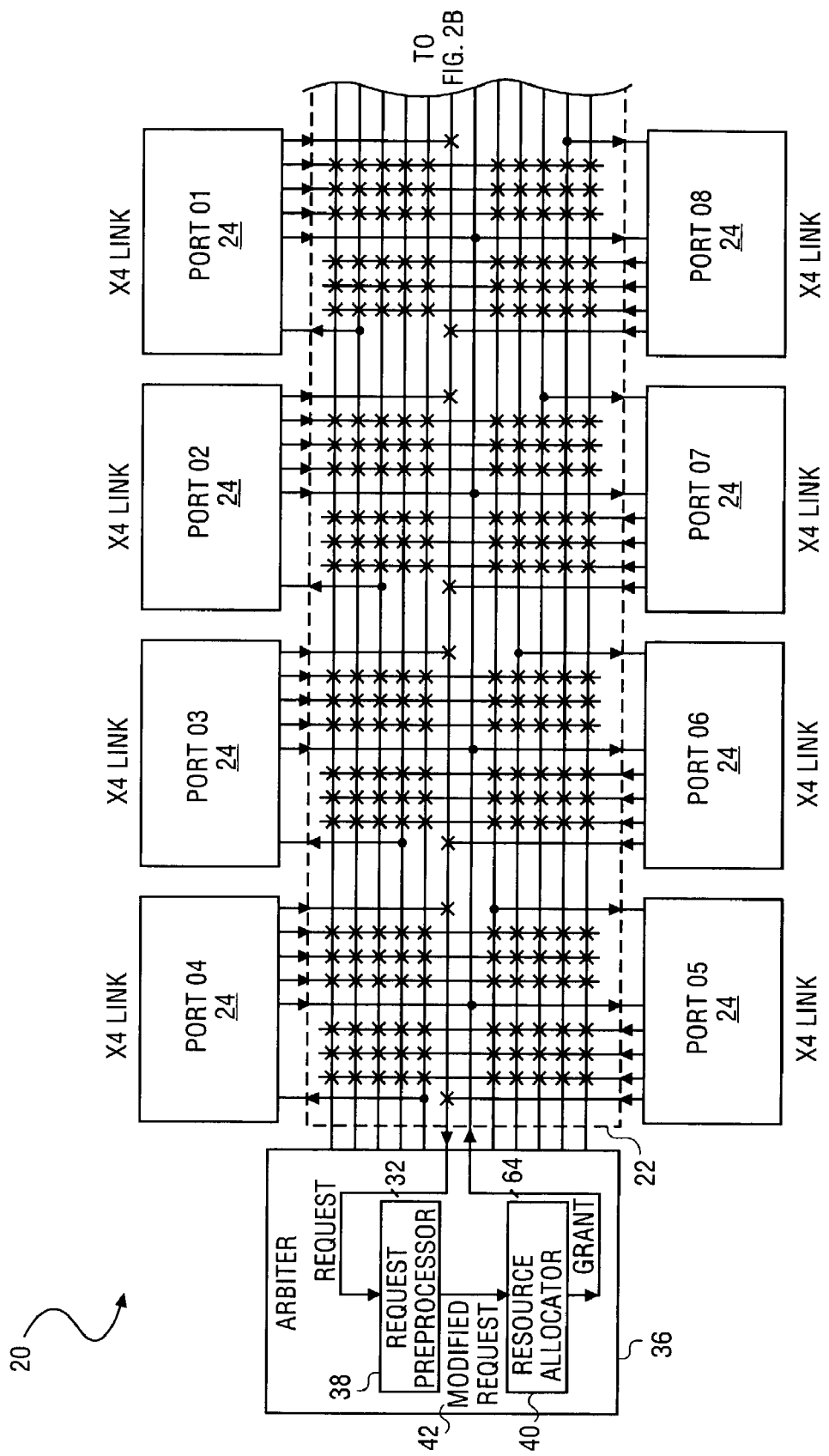
FIGS. 2A and 2B provide a diagrammatic representation of a datapath, according to an exemplary embodiment of the present invention, implemented within an interconnect device (e.g., a switch).
Figure 2B:
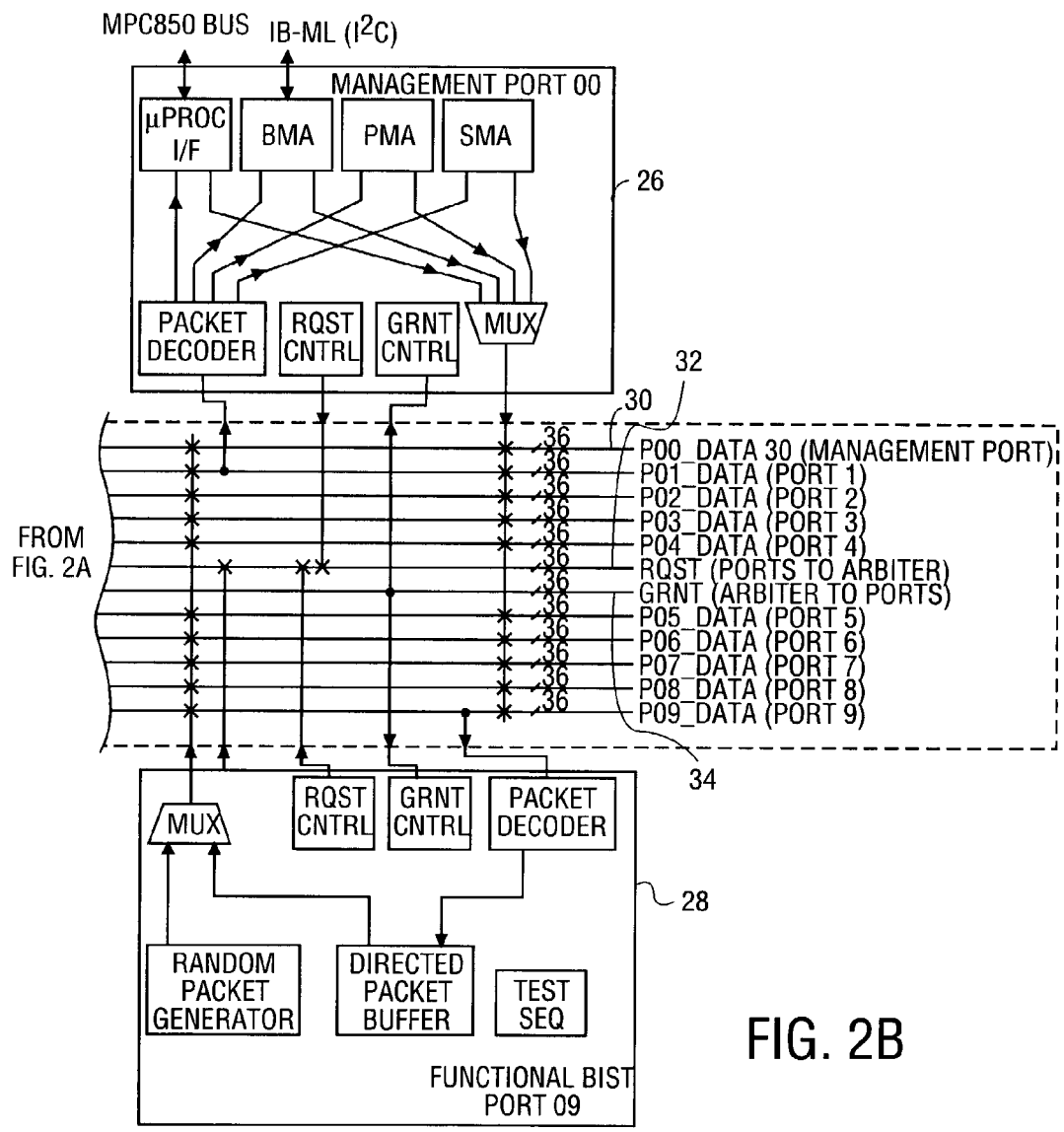

FIGS. 2A and 2B provide a diagrammatic representation of a datapath 20, according to an exemplary embodiment of the present invention, implemented within an interconnect device (e.g., a switch). The datapath 20 is shown to include a crossbar 22 that includes ten 36-bit data buses 30, a 66-bit request bus 32 and a 64-bit grant bus 34. Coupled to the crossbar are eight communication ports 24 that issue resource requests to an arbiter 36 via the request bus 32, and that receive resource grants from the arbiter 36 via the grant bus 34.

The arbiter 36 includes a request preprocessor 38 to receive resource requests from the request bus 32 and to generate a modified resource request 42 to a resource allocator 40. The resource allocator 40 then issues a resource grant on the grant bus 34. Further details regarding the arbiter 36 will be discussed in detail below.

FIG. 3 illustrates two examples of packet transfer requests, namely a destination routing request 70 and a direct routing request 72. An exemplary credit update request 74 is also shown.

Arbiter

Figure 4:
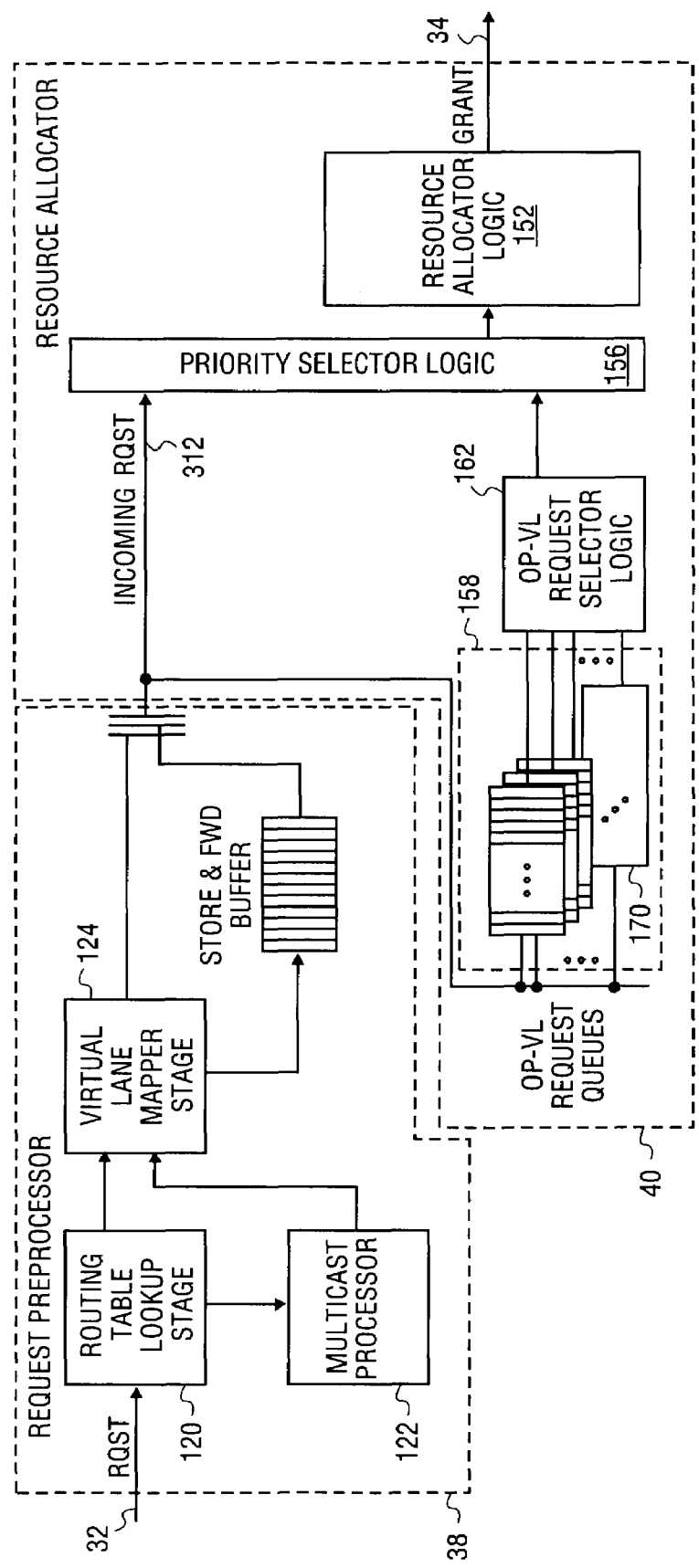
FIG. 4 is a block diagram illustrating the conceptual architecture of an arbiter, according to an exemplary embodiment of the present invention.

FIG. 4 is a conceptual block diagram of the arbiter 36, according to an exemplary embodiment of the present invention. The arbiter 36 is shown to include the request preprocessor 38 and the resource allocator 40. The arbiter 36 implements a central arbitration scheme within the datapath 20, in that all requests and resource information are brought to a single location (i.e., the arbiter 36). This offers certain advantages in that a central, consolidated view of resource availability and demand allow efficient resource allocation and potentially increased throughput. It should however be noted that the present invention may also be deployed within a distributed arbitration scheme, wherein decision making is performed at local resource points to deliver potentially lower latencies.

The arbiter 36, in the exemplary embodiment, implements serial arbitration in that one new request is accepted per cycle, and one grant is issued per cycle. The exemplary embodiment implements serialization as it is envisaged that an interconnect device including the datapath 20 will have an average packet arrival with a rate of less than one packet per clock cycle. Again, in deployments where the average packet arrival rate is greater than one packet per clock cycle, the teachings of the present invention may be employed within an arbiter that implements parallel arbitration.

Dealing first with the request preprocessor 38, a request (e.g., a destination routing, direct routing or credit update request 70, 72 or 74) is received on the request bus 32 at a routing table lookup stage 120 that includes both unicast and multicast routing tables (not shown). Specifically, a packet's destination address 90 is utilized to perform a lookup on both the unicast and multicast routing tables. If the destination address is for a unicast address, the destination address 90 is translated to an output port number 132. On the other hand, if the destination is for a multicast group, a multicast processor 122 spawns multiple unicast requests based on a lookup in the multicast routing table.

From the routing table lookup stage 120, a request is forwarded to a virtual lane mapper stage 124 where a request's service level identifier 94, input port identifier 82 and output port identifier 132 (determined at stage 120) are utilized to perform a lookup in a virtual lane map (not shown) and to output a virtual lane identifier 134.

Figure 5:
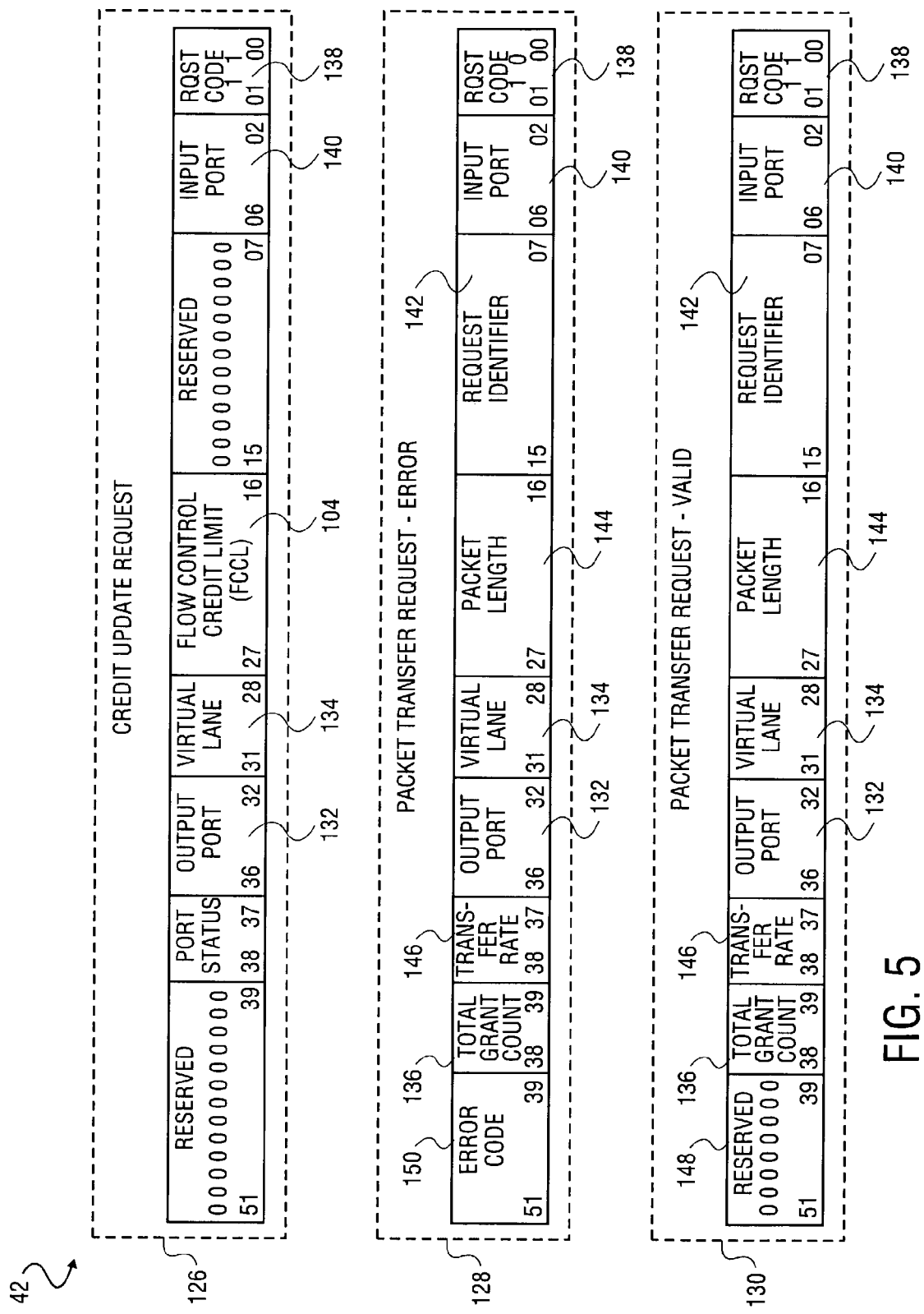
FIG. 5 provides representations of exemplary modified resource requests that may be outputted from a request preprocessor to a request allocator of the arbiter illustrated in FIG. 4.

Accordingly, the output of the request preprocessor 38 is a modified request that is derived from a request, such as any of those shown in FIG. 3. FIG. 5 is a diagrammatic representation of exemplary modified resource requests 42 that may be outputted from the request preprocessor 38 to the resource allocator 40.

Returning to FIG. 4, a modified incoming request (e.g., a modified resource request 42 such as any of the requests 126, 128 or 130) 312 is received at the resource allocator 40 from the request preprocessor 38. An incoming (or just-arrived) modified request 312 may proceed directly to resource allocator logic 152, if there is no contention with further pending requests stored in an OP-VL Request Queue 170 that are awaiting processing by the resource allocator logic 152. If such contention does exist, an incoming modified request 312 is placed at the back of the appropriate OP-VL Request Queue 170.

As stated above, FIG. 4 is a conceptual diagram of the arbiter 36, and the various queues and selectors described above may not be physically implemented as discrete components or logic blocks. For example, the request queues discussed below and above are, in one embodiment, each implemented as link lists within a single pending request buffer. Nonetheless, for a conceptual understanding of the present invention, it is useful to make reference to FIG. 4.

The resource allocator 40 is shown to include priority selector logic 156 that implements a priority scheme to feed resource requests from one of two sources to the resource allocator logic 152. The two sources from which the priority selector logic 156 selects a resource request are: (1) an incoming request 312; and (2) a group 158 of output port-virtual lane (OP-VL) request queues 170. The group 158 of output port-virtual lane (OP-VL) request queues 170 has output port-virtual lane (OP-VL) request selector logic 162 associated therewith for performing a selection of requests from within the group 158 of queues for presentation to the priority selector logic 156. Further details regarding the population of the groups 158 of queues with requests will be provided below. It will be noted that two levels of selection logic are employed for these groups of queues. A first level of selection logic is employed to select requests from a group 158 of queues associated with a first resource type (e.g., output port-virtual lane combinations), each queue being associated with a specific instance of the resource type. A second level of selection logic is employed to select between requests that emerge from each group of queues based on a priority scheme.

At a high level, the arbiter 36 employs an "all-or-nothing" allocation policy. Considering a request received at the resource allocator logic 152 from the priority selector logic 156, if (1) sufficient flow control credits for a virtual lane identified by the virtual lane identifier 134 of the request are available, (2) if an output port identified by the output port identifier 132 of the request is available and (3) if an input port identified by the input port identifier 140 of the request is available, then both the virtual lane, the output port and the input port identified within the relevant request are allocated to the request by the resource allocator logic 152.

On the other hand, if either insufficient flow control credits for a virtual lane, the output port itself, or the input port itself are currently unavailable, then no resources (i.e., neither the virtual lane nor the output port nor the input port) are allocated, and then the request, if an incoming request, is placed at the back of an output port-virtual lane (OP-VL) request queue 170 corresponding to the requested output port and virtual lane. If the request is from OP-VL selector logic, then the request is placed at the head of the OP-VL request queue 170 corresponding to the requested output port and virtual lane.

The output port-virtual lane request selector logic 162 monitors each of the request queues 170 within the group 158 of output port-virtual lane request queues. As flow control credits and output ports become available, the selector logic 162 chooses among pending requests in the group 158 of queues. In an exemplary embodiment of the present invention where the arbiter 36 supports the InfiniBand™ Architecture, the output port-virtual lane request selector logic 162 may implement the InfiniBand VL arbitration scheme.

Upon the availability of all resources required to satisfy a particular request, the resource allocator logic 152 will issue a grant, on the grant bus 34. The grant contains a number of fields in common with a request, as well as an additional grant code, a total blocks sent field, and an error code field.

Figure 6:
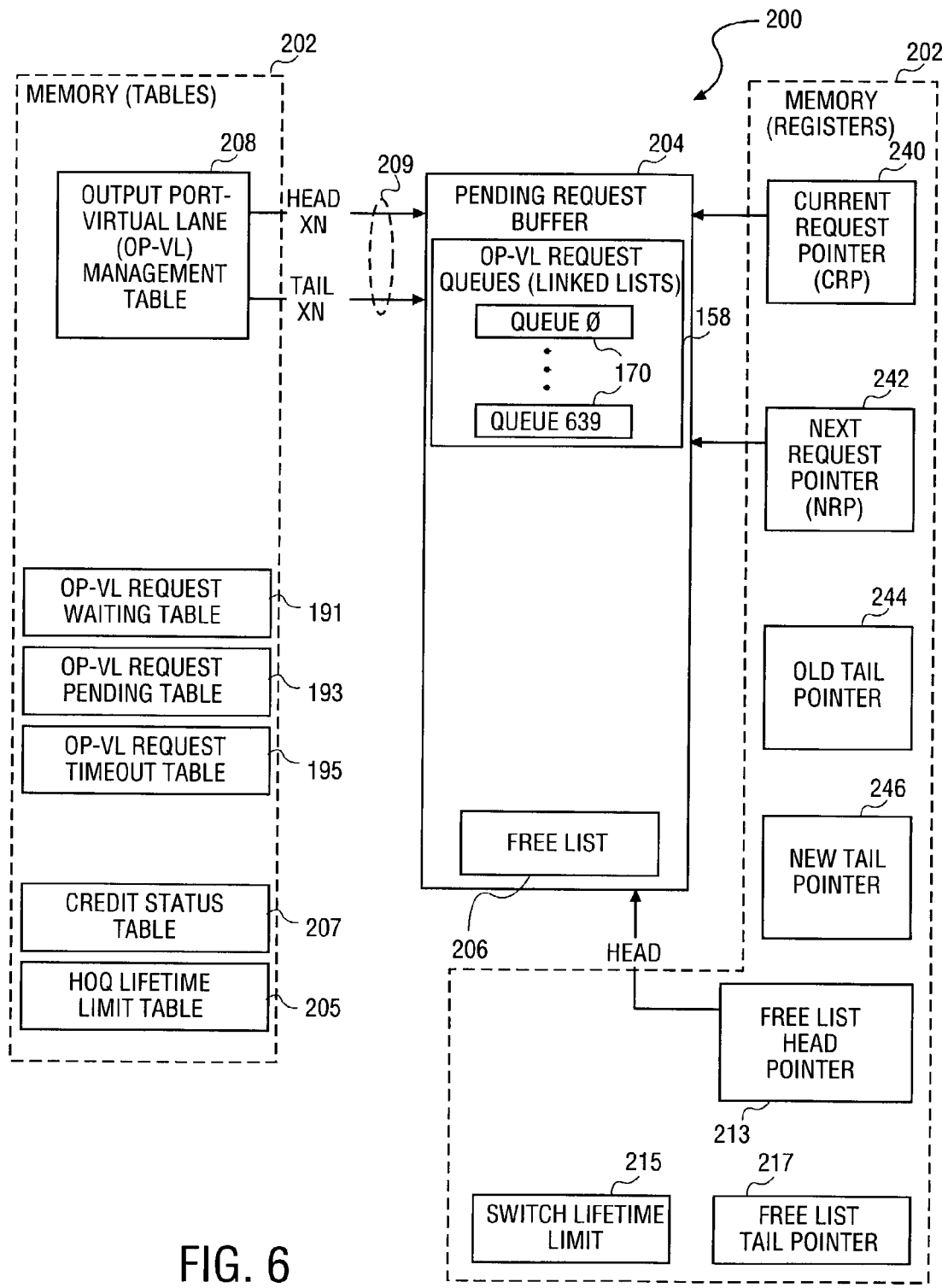
FIG. 6 is a block diagram illustrating a physical architecture of a pending request handler, according to an exemplary embodiment of the present invention, that includes a memory (e.g., a RAM) and a pending request buffer.

FIG. 4 also provides a conceptual diagram of the various request queues that may be maintained in the arbiter 36. FIG. 6 is a block diagram illustrating the physical architecture of a pending request handler 200, according to an exemplary embodiment of the present invention, that includes a memory 202 (e.g., a collection of Random Access Memories (RAM s) and registers) and a pending request buffer 204. At a high level, all requests received at the resource allocator 40 from the request preprocessor 38 are stored within the pending request buffer 204 until grant. In one embodiment, the pending request buffer 204 maintains multiple groups of queues, each group of queues being dedicated to a specific resource type. Accordingly, each group of queues is constituted by queues associated with a specific instance of a relevant resource type (e.g., ports, virtual lanes, etc.). In the exemplary embodiment, the pending request buffer 204 is shown to store the group 158 of output port-virtual lane (OP-VL) request queues 170 and a free list 206. Each queue within the pending request buffer 204 is furthermore maintained as a link list, in that each entry includes a pointer to at least a next (or preceding) entry of the relevant queue.

A number of tables for managing the queues maintained within the pending request buffer 204 are shown to be implemented within the memory 202. Specifically an output port-virtual lane (OP-VL) management table 208 maintains a head and tail pointer for each of the OP-VL request queues 170 of the group 158.

Management Tables

Figure 7:
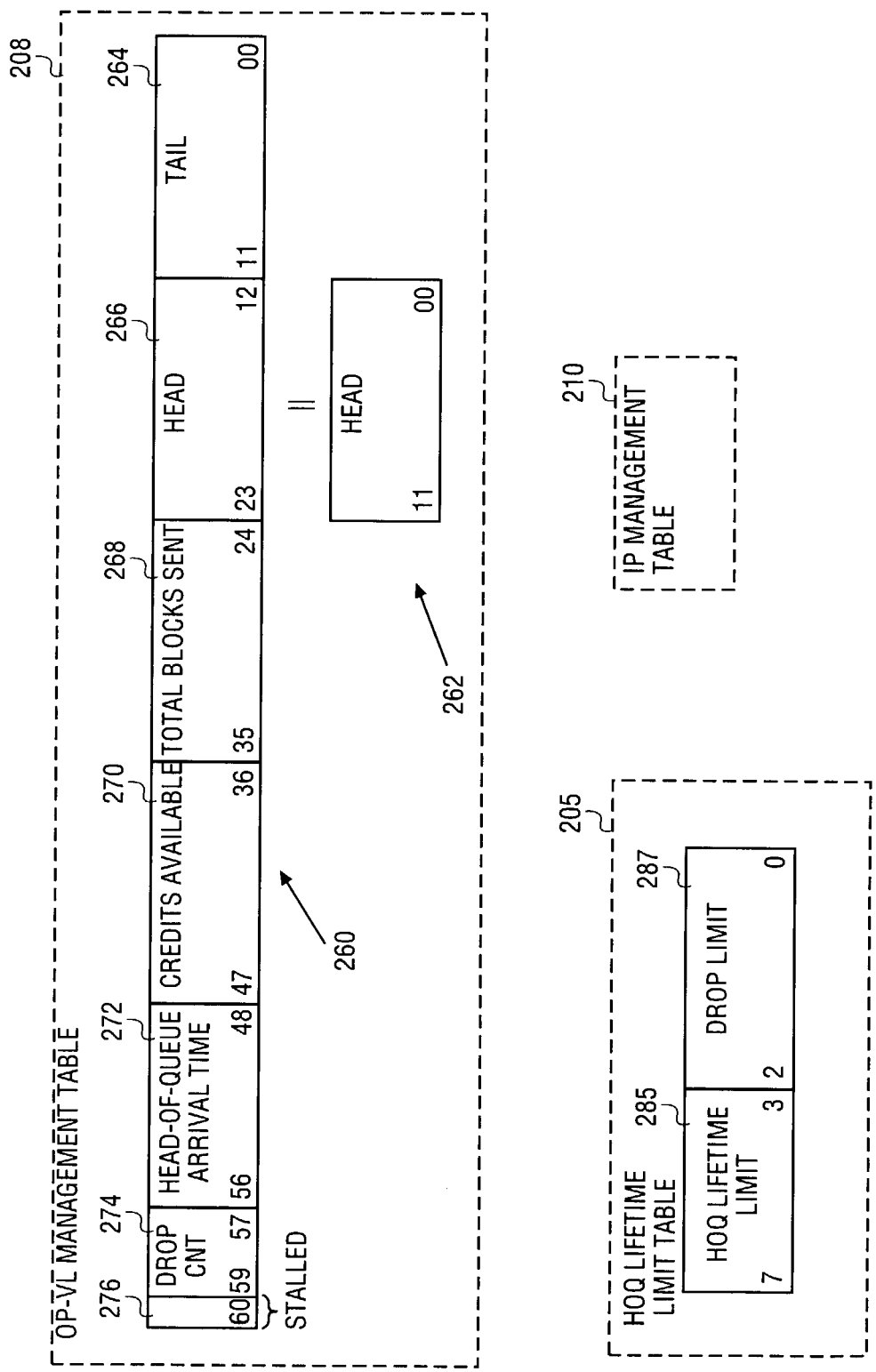
FIG. 7 provides diagrammatic representation of the content of entries within an OP-VL management table and an IP management table, according to an exemplary embodiment of the present invention.

FIG. 7 shows diagrammatic representations of the content of entries within the OP-VL management table 208 and the HOQ lifetime limit table 205, according to an exemplary embodiment of the present invention.

The OP-VL management table 208, as discussed above, includes an entry for each OP-VL request queue 170, and each entry includes information pertaining to a respective queue 170. In one embodiment, the OP-VL management table 208 includes 640 entries for a datapath 20 that has forty ports and supports sixteen virtual lanes.

As shown in FIG. 7, the management table 208 includes two banks, namely a primary bank 260 that constitutes a main copy of all fields, and a head bank 262 that is a duplicate copy of the head-of-queue pointer that is utilized to initiate processing of the request at the head of the queue. The fields within the primary bank 260 include, for an associated queue 170, a tail pointer 264, a head pointer 266, a total blocks sent indicator 268 that records the total number of blocks sent to the OP-VL combination, a credits available indicator 270, a head-of-queue arrival time 272, a drop count 274 and stalled flag 276.

The HOQ lifetime limit table 205 includes a HOQ lifetime limit 285 and a drop limit 287 for each port of the relevant switch.

Figure 8B:
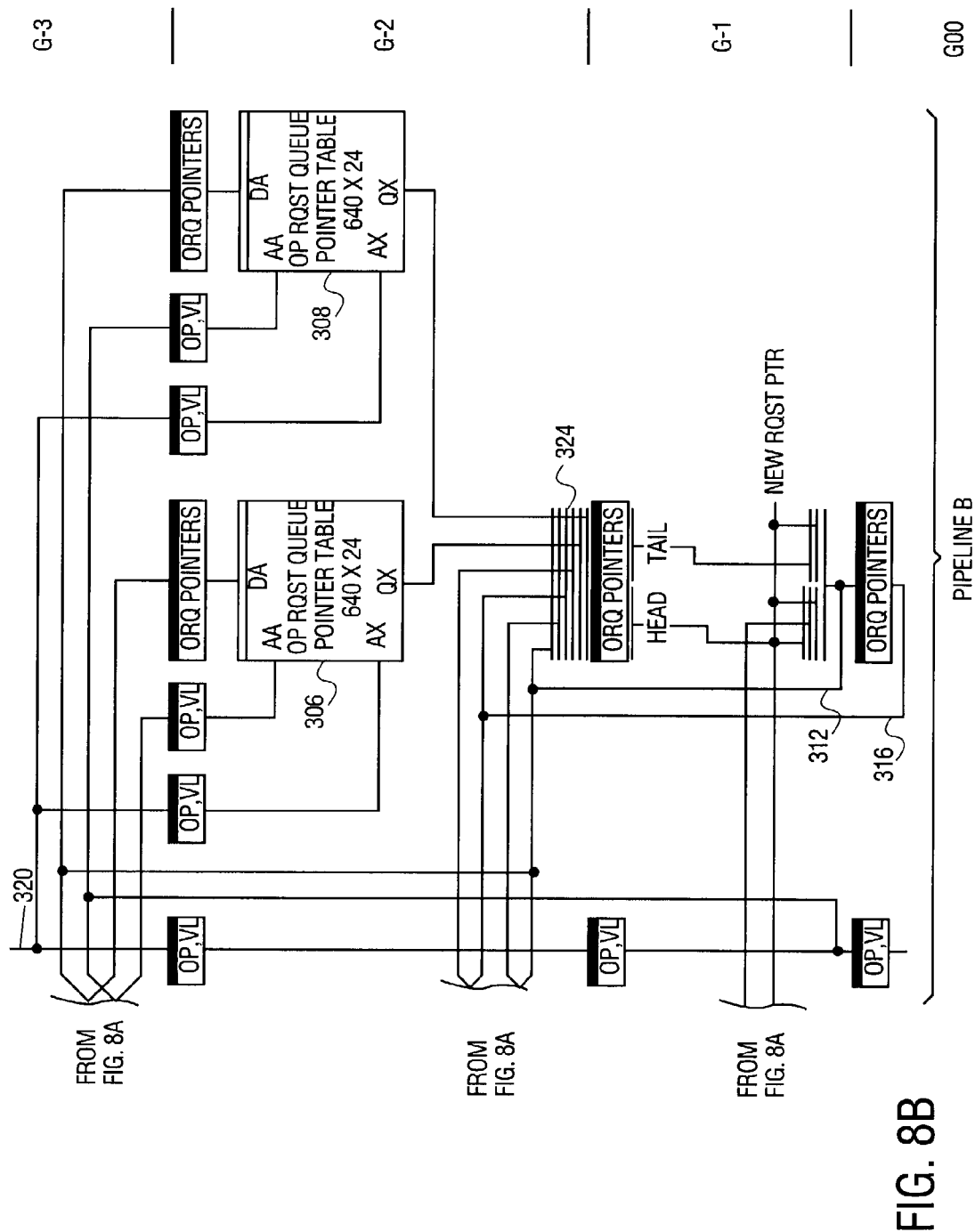

FIGS. 8A and 8B provide a pipestage representation 317 of the functioning of the OP-VL management table 208 head 266 and tail 264 pointers according to an exemplary embodiment of the invention. In the exemplary embodiment of the OP-VL management table 208, four separate but interconnected memories (e.g., random access memories, flash memories, etc.) are maintained. The four interconnected memories each maintain a copy of the OP-VL management table 208. In the exemplary embodiment, the four memories include a first RAM 302, second RAM 304, third RAM 306, and fourth RAM 308. Each of RAM 302, RAM 304, RAM 306, and RAM 308 are each single read/single write (1W1R) dual-port memories. In an alternative embodiment a flash memory may be utilized in place of each of the RAM.

In the exemplary embodiment of the invention, read, computation, and write operations for each of the first pipeline 318 and the second pipeline 320 as they relate to the OP-VL management table 208 overlap. Hence, each pipeline needs one read port and one write port to the OP-VL management table 208. To support both pipelines, the OP-VL management table 208 needs two write ports and two read ports.

The pipestage representation 317 further provides a first pipeline read bypass 310, second pipeline read bypass 312, first pipeline write bypass 314, and second write pipeline bypass 316. Data may be retrieved from bypass 310, bypass 312, bypass 314, or bypass 316 or from one of the four separate copies of the table (e.g., OP-VL management table). The ability to retrieve data from one of the bypasses (e.g., 310, 312, 314, or 315) provides assurance that the data (e.g., an OP-VL request queue record) requested from a specific memory location in a (e.g., the OP-VL management table) is not stale. For example, in situations where access to the same memory location is attempted within two clock cycles of a preceding read, the data may be stale. This results because while the second request is accessing the data, the previous request has already retrieved the data and may be modifying the data. Thus, the second request is not working with an accurate copy of the data. The typical method of preventing the retrieval of stale data (e.g., inaccurate data) is to hold the second request back until the first request has modified (e.g., via computations, etc.) and written the data back to memory. However, in the exemplary embodiment, as will be explained in FIG. 9 below, bypasses may be utilized to allow the access of data in consecutive clock cycles while at the same time assuring the accuracy of the data.

Returning to FIG. 8, in the exemplary embodiment, the pipestage representation 317 also provides a first pipeline 318 and a second pipeline 320. Requests to read data are received via the first pipeline 318 and the second pipeline 320. In the exemplary embodiment, the pipeline stage representation 317 is also shown to include a first pipeline mux 322 and a second pipeline mux 324.

In the exemplary embodiment, the OP-VL management table 208 is used to implement multiple request queues using linked lists. The request queues may number in the hundreds. There is a different queue for each output port, virtual lane combination. The actual requests are stored in the pending request buffer 204. Associated with each request is a pointer to the next request in the queue in which it resides. Each queue has a descriptor which contains a head pointer 264, a tail pointer 266 and other information regarding the queue's status and that of the first request in the queue. The descriptors are stored in a queue management table 208 which has one entry per queue. As explained above, the four interconnected memories each maintain a copy of the OP-VL management table 208. Each record in the OP-VL management table 208 as it relates to each specific OP-VL request queue 170 is stored at the same memory location (e.g., memory address) within each of the four copies of the OP-VL management table 208. In addition, a control bit (e.g., 0 or 1) is associated with each of the four copies of each record. As will be explained below and in Tables 1 and 2, the control bits in combination with the memories (e.g., RAM1, RAM2, RAM3 and RAM4) are utilized to determine which memory a requested record is to be read from. In one embodiment, each of the memories include an extra bit (e.g., 25 bit RAM) allowing for a 24 bit data record and one control bit. In another embodiment, the memories do not include an extra bit and the control bits associated with a data record are not included within the data record.

TABLE 1

| | FIRST PIPELINE 318 | | | |
| --- | --- | --- | --- | --- |
| | RAM 302 | RAM 304 | RAM 306 | RAM 308 |
| READ | X | X | | |
| WRITE | X | | X | |

Table 1 shows which of RAM 302, RAM 304, RAM 306 and RAM 308 is accessed in relation to reads made via the first pipeline 318 and writes resulting from reads made via the first pipeline 318. Table 1 specifically applies to the situation in which the data record is not being written in the current clock cycle and the data record was not read in the immediately preceding clock cycle (e.g., bypasses 310, 312, 314, and 316 will not be utilized). As provided above, each data record stored in each of the four memories (RAM 302, RAM 304, RAM 306 and RAM 308) includes a control bit (e.g., 1 and 0). Each request received via the first pipeline 318 will either read RAM 302 or RAM 304 according to control bits associated with the data record to be read. When writing a data record following a read request received via the first pipeline, the data record is always written back to both RAM 302 and RAM 306. In addition, the control bit associated with the data record in RAM 302 and RAM 306 is updated with the control bit associated with the data record in RAM 304, resulting in all four control bits associated with the four copies of the data record having the same control bit value. In order to determine whether RAM 302 or RAM 304 is read in response to a read request, a comparison of the control bits associated with each of RAM 302's copy and RAM 304's copy of the requested data record is made. In the exemplary embodiment, an operation (e.g., XOR) is utilized to make the comparison. There are four possible combinations of control bits including 11, 00, 01 and 10 associated with a data record. If the results of the XOR operation provide 0 (i.e. equal) then the requested data record is read from RAM 302. On the other hand, if the results provided 1 (i.e. not equal) then the requested data is read from RAM 304.

TABLE 2

| | SECOND PIPELINE 320 | | | |
|---|---|---|---|---|
| | RAM 302 | RAM 304 | RAM 306 | RAM 308 |
| READ | | | X | X |
| WRITE | | X | | X |

Table 2 shows which of RAM 302, RAM 304, RAM 306 and RAM 308 is accessed in relation to reads made via the second pipeline 320 and writes resulting from reads made via the second pipeline 320. Table 2 specifically applies to the situation in which the data record is not being written in the current clock cycle and the data record was not read in the immediately preceding clock cycle (e.g., bypasses 310, 312, 314, and 316 will not be utilized). As provided above, each data record stored in each of the four memories (RAM 302, RAM 304, RAM 306 and RAM 308) includes a control bit (e.g., 1 and 0). Each request received via the second pipeline 320 will either read RAM 306 or RAM 308 according to control bits associated with the data record to be read. When writing a data record following a read request received via the second pipeline, the data record is always written back to both RAM 304 and RAM 308. In addition, the control bit associated with the data record in RAM 304 and RAM 308 is updated with the compliment of the control bit associated with the data record in RAM 306. As a result, the control bits associated with a data record stored in RAM 302 and RAM 306 have the same value and control bits of the same data record stored in RAM 304 and RAM 308 and have the complimentary value of RAM 302 and RAM 306. In order to determine whether RAM 306 or RAM 308 is read in response to a read request, a comparison of the control bits associated with each of RAM 306's copy and RAM 308's copy of the requested data record is made. In the exemplary embodiment, an operation (e.g., XOR) is utilized to make the comparison. There are four possible combinations of control bits including 11, 00, 01 and 10 associated with a data record. If the results of the XOR operation provide 0 (i.e. equal) then the requested data record is read from RAM 306. On the other hand, if the results provided 1 (i.e. not equal) then the requested data is read from RAM 308.

Figure 9A:
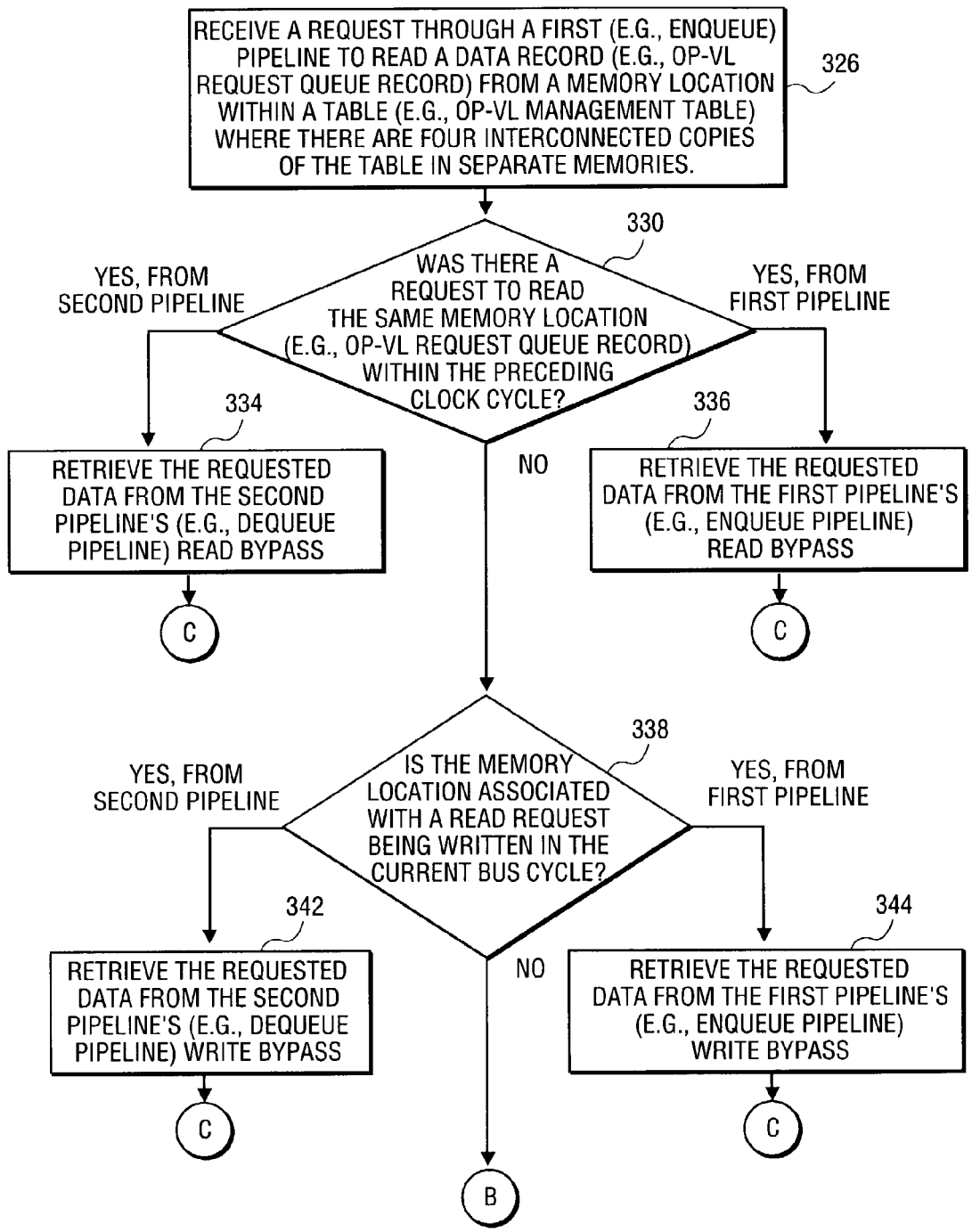
FIGS. 9A–9B show a flow chart illustrating operations, according to an exemplary embodiment of the present invention, performed at each of the respective pipestages illustrated in FIGS. 8A–8B.
Figure 9B:
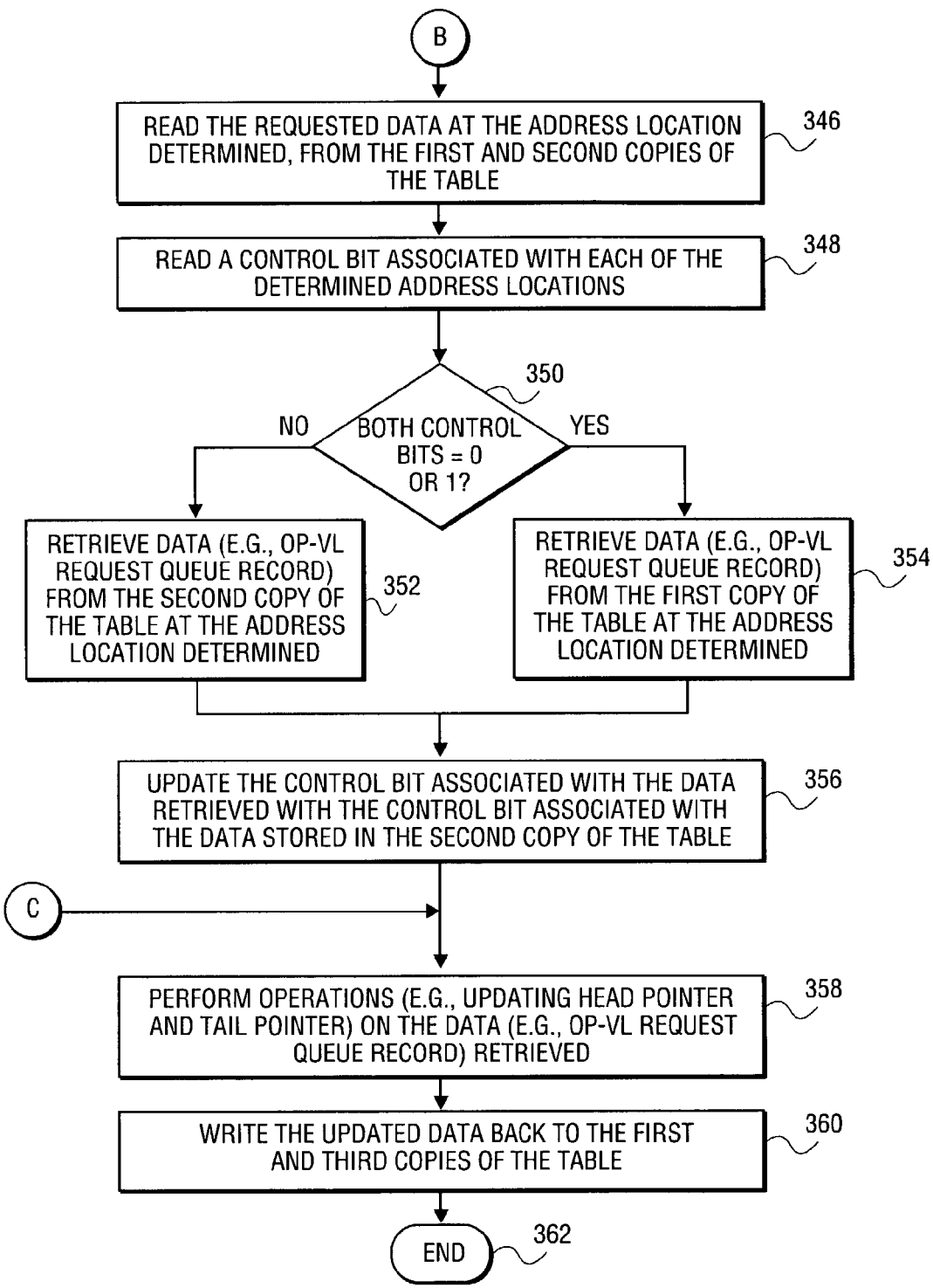

FIGS. 9A and 9B (the first pipeline) is a flow chart illustrating a method 325, according to an exemplary embodiment of the present invention, of handling simultaneous requests to access a table (e.g., OP-VL management table 208) in a memory. In the exemplary embodiment, a first pipeline 318 (e.g., enqueue pipeline) and a second pipeline 320 (e.g., dequeue pipeline) are permitted to read and write to the table (e.g., OP-VL management table 208).

At block 326, a request is received through the first pipeline 318, where there are four identical copies of the table. In the exemplary embodiment, each of the four identical copies of the table is stored to RAM 302, RAM 304, RAM 306, and RAM 308. In the dual pipeline structure of FIG. 8, the first pipeline 318 may handle all accesses to records related to enqueuing at OP-VL request queues 170 and the second pipeline 320 may handle all accesses to records related to dequeuing at OP-VL request queues 170.

At decision block 330, a determination is made as to whether the request to read the memory location within the table (e.g., OP-VL management table 208) via the first pipeline 318 was made within the preceding clock cycle. In the exemplary embodiment, the memory location is an OP-VL request queue record within an OP-VL management table 208.

At decision block 330, there is the possibility that the same memory location was read during the proceeding clock cycle from both pipelines. Logic detects when the first pipeline and the second pipeline simultaneously access the same memory location. In this event, the retrieved data is the same. In the preferred embodiment, the two pipelines exchange update operations so both pipelines produce the same results. That means first pipeline's read bypass 310 equals the second pipeline's read bypass 312. In the next clock cycle, the first pipeline's write bypass 314 will equal the second pipeline's write bypass 316. Since all four copies of the record will be the same, the values of the control bits between the first and second pipelines does not matter.

Alternative embodiments may give one pipeline priority over the other when simultaneous accesses are made to the same location.

At block 334, the requested data (e.g., OP-VL request queue record and its associated control bit) is retrieved from the second pipeline's read bypass 312 if a determination at decision block 330 is made that the request made within the preceding clock cycle was not made via the first pipeline 318.

At block 336, the requested data (e.g., OP-VL request queue record and its associated control bit) is retrieved from the first pipeline's read bypass 310 if a determination at decision block 330 is made that the request made within the preceding clock cycle was made via the first pipeline 318.

At block 358, the data (e.g., OP-VL request queue record and its associated control bit) retrieved in either of block 334 or block 336 may be updated (e.g., updated head and tail pointer field of OP-VL request record). The control bit is not altered.

At block 360, the data (e.g., OP-VL request queue record and its associated control bit) is written back to the first and third copies of the table. Importantly, the data is written back to the same memory location within each table and to the same memory location from which the data was originally retrieved.

Returning to decision block 330 of FIG. 9. If a determination is made that a request was not made to read the same memory location within the preceding clock cycle, then at decision block 338, a determination is made as to whether the memory location is being written in the current clock cycle.

At block 342, the requested data (e.g., OP-VL request queue record and its associated control bit) is retrieved from the second pipeline's write bypass 316 if a determination at decision block 340 is made that the request made within the preceding clock cycle was made via the second pipeline.

At block 344, the requested data (e.g., OP-VL request queue record and its associated control bit) is retrieved from the first pipeline's write bypass 314 if a determination at decision block 340 is made that the request made within the preceding clock cycle was made via the first pipeline.

At block 358, the data (e.g., OP-VL request queue record and its associated control bit) retrieved in either of block 342 or block 344 may be updated (e.g., update head and tail pointer field of OP-VL request record). The control bit is not altered.

At block 360, the data (e.g., OP-VL request queue record and its associated control bit) is written back to the first and third copies of the table. Importantly, the data is written back to the same memory location within each table and to the same memory location from which the data was originally retrieved.

Return to block 338 of FIG. 9. If a determination is made at decision block 338, that the memory location to be read is not being written in the current clock cycle then at block 346, the memory location will be read from the first and second copies of the table (e.g., OP-VL management table 208).

At block 348, two control bits associated with the memory location read in each the first and second copies of the table is identified.

At block 350, a determination is made as to whether both control bits equal zero or one. If both bits equal zero or one, at block 354, the requested data is retrieved from the first copy of the management table. If both control bits do not equal zero or a one, at block 352, the requested data is retrieved from the second copy of the management table.

At block 356, the control bit associated with the data retrieved is updated (i.e., set equal to) with the control bit associated with the second copy of the management table, regardless of which copy was retrieved.

At block 358, operations are performed on the data retrieved from the management table (e.g., OP-VL management table 208). For example, the head and tail pointers for a corresponding OP-VL request queue record may be updated.

At block 360, the updated data is copied to the first copy of the table 302 and the third copy of the table 306.

At block 362, the method ends.

Figure 10A:
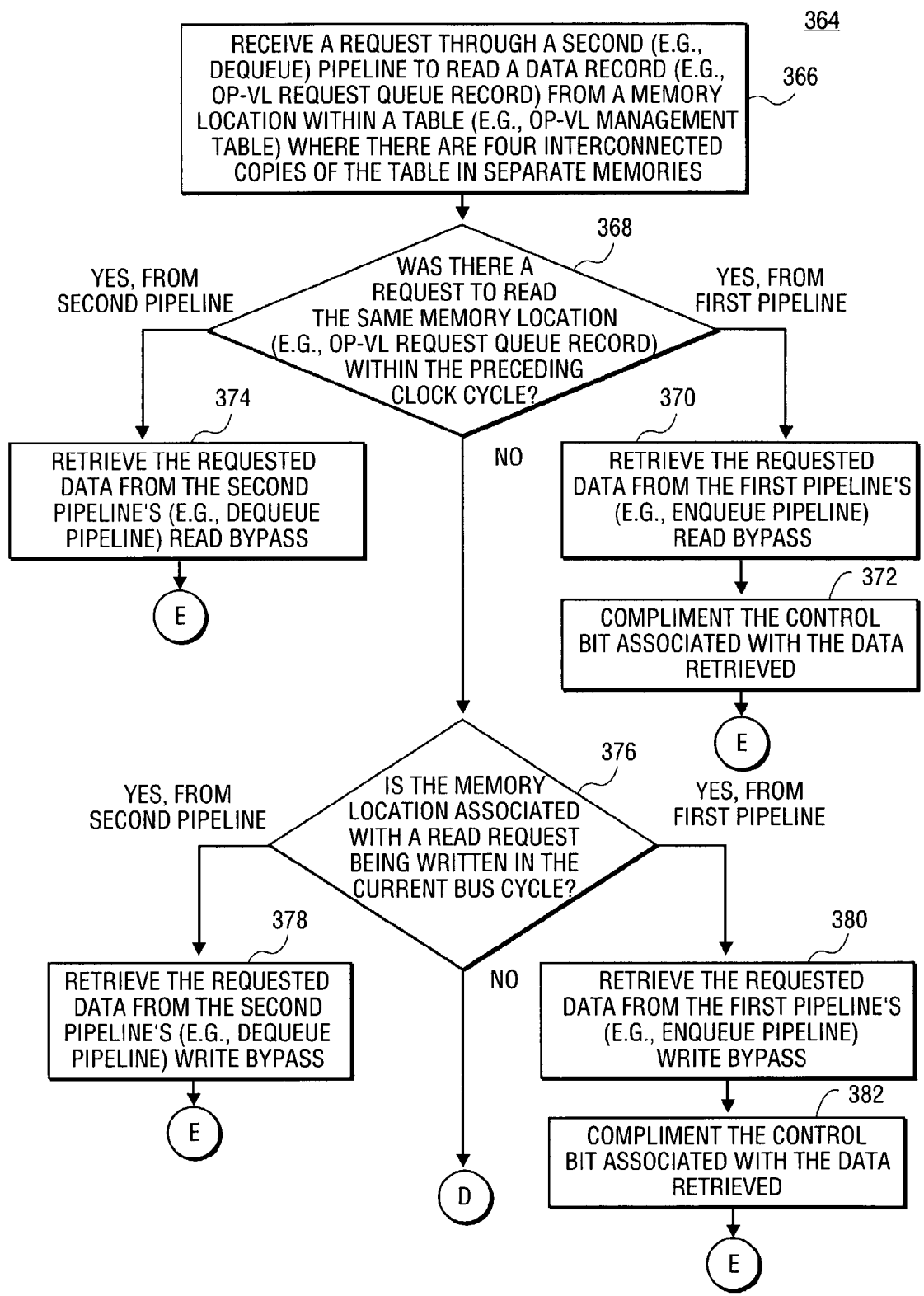
FIGS. 10A–10B show a flow chart illustrating operations, according to an exemplary embodiment of the present invention, performed at each of the respective pipestages illustrated in FIGS. 8A–8B.
Figure 10B:
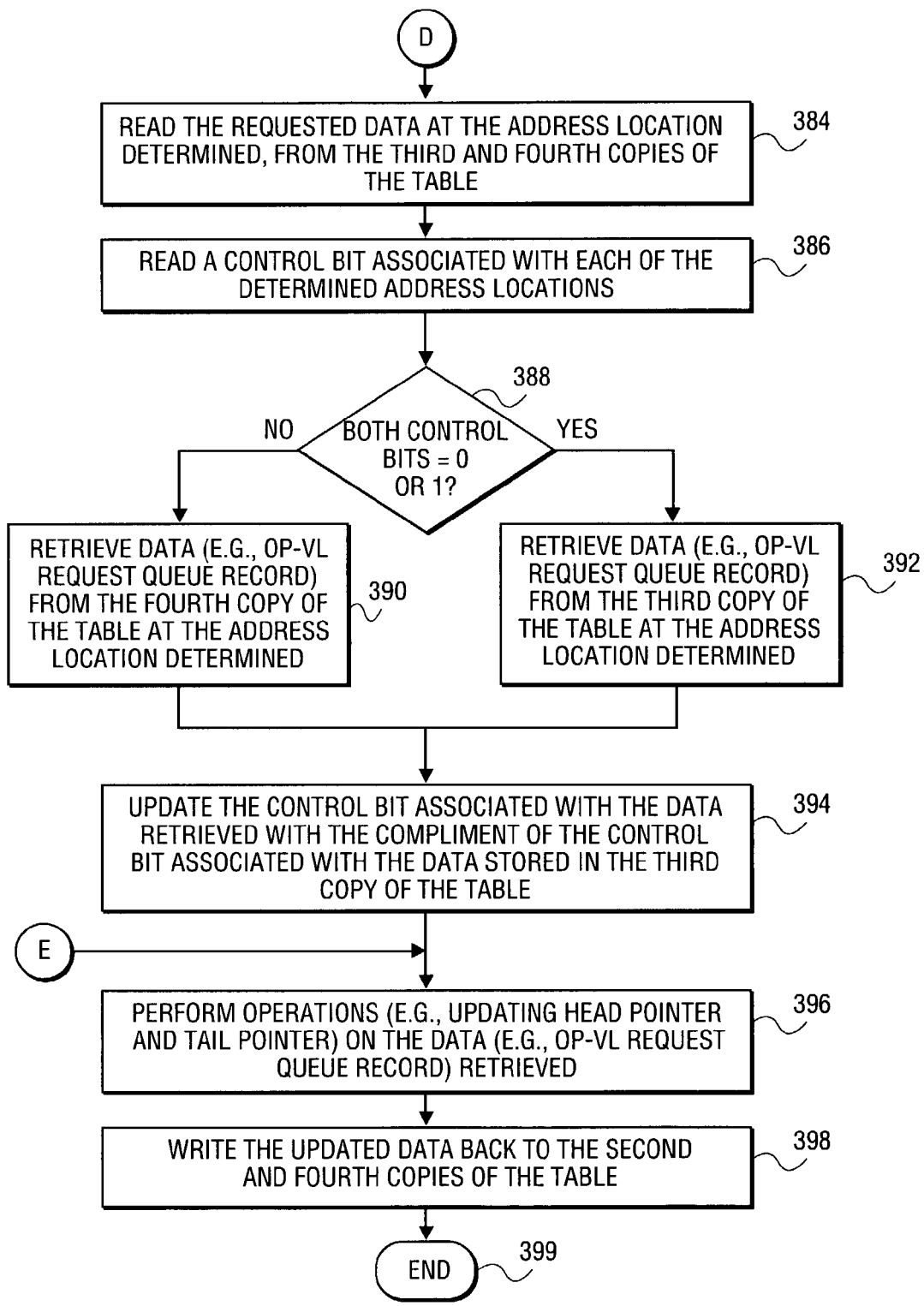

FIGS. 10A and 10B (the second pipeline). At block 366, a request to read a data record (e.g., OP-VL request queue record and its associated control bit) from a memory location within a table (e.g., OP-VL management table) where there are four interconnected copies of the table in separate memories is received via the second (e.g., dequeue) pipeline.

At decision block 368, a determination is made as to whether the previous request to read the same memory location within the preceding clock cycle.

At decision block 368, there is the possibility that the same memory location was read during the proceeding clock cycle from both pipelines. Logic detects when the first pipeline and the second pipeline simultaneously access the same memory location. In this event, the retrieved data is the same. In the preferred embodiment, the two pipelines exchange update operations so both pipelines produce the same results. That means first pipeline's read bypass 310 equals the second pipeline's read bypass 312. In the next clock cycle, the first pipeline's write bypass 314 will equal the second pipeline's write bypass 316. Since all four copies of the record will be the same, the values of the control bits between the first and second pipelines does not matter.

Alternative embodiments may give one pipeline priority over the other when simultaneous accesses are made to the same location.

At block 370, the requested data (e.g., OP-VL request queue record and its associated control bit) is retrieved from the first pipeline's read bypass 310 if a determination at decision block 368 is made that the request made within the preceding clock cycle was made via the first pipeline.

At block 372, the control bit associated with the data retrieved is complimented. In the exemplary embodiment, an inverter is utilized to provide the compliment operation.

At block 374, the requested data (e.g., OP-VL request queue record and its associated control bit) is retrieved from the second pipeline's read bypass 312 if a determination at decision block 368 is made that the request made within the preceding clock cycle was made via the second pipeline.

At block 396, the data (e.g., OP-VL request queue record and its associated control bit) retrieved in either of blocks 370, 374, 378, 380, 390 or 392 may be updated (e.g., updated head and tail pointer field of OP-VL request record).

At block 398, the data (e.g., OP-VL request queue record and its associated control bit) is written back to the second and fourth copies of the table. Importantly, the data is written back to the same memory location within each table and to the same memory location from which the data was originally retrieved.

Returning to decision block 368 of FIG. 10. If a determination is made that a request was not made to read the same memory location within the preceding clock cycle, then at decision block 376 a determination is made as to whether the memory location associated with the read request is being written in the current clock cycle.

At block 380, the requested data (e.g., OP-VL request queue record and its associated control bit) is retrieved from the first pipeline's write bypass 314 if a determination at decision block 376 is made that the requested data is being written in the current clock cycle and the request associated with the write was made via the first pipeline 318.

At block 382, the control bit associated with the data retrieved is complimented.

At block 378, the requested data (e.g., OP-VL request queue record and its associated control bit) is retrieved form the second pipeline's write bypass 316 if a determination at decision block 376 is made that the requested data is being written in the current clock cycle and the request associated with the write was made via the second pipeline 320.

At block 396, the data (e.g., OP-VL request queue record and its associated control bit) retrieved in either of blocks 370, 374, 378, 380, 390 or 392 may be updated (e.g., updated head and tail pointer field of OP-VL request record).

At block 398, the data (e.g., OP-VL request queue record and its associated control bit) is written back to the second and fourth copies of the table. Importantly, the data is written back to the same memory location within each table and to the same memory location from which the data was originally retrieved.

Return to block 376 of FIG. 10. If a determination is made at decision block 376, that the memory location to be read is not being written in the current clock cycle, then at block 384 the memory location will be read from the third and fourth copies of the table.

At block 386, a control bit associated with the memory location read in the third and fourth copies of the table is identified.

At block 388, a determination is made as to whether both control bits equal zero or one. If both bits equal zero or one, at block 392, the requested data is retrieved from the third copy of the management table. If both control bits do not equal zero or a one, at block 390, the requested data is retrieved from the fourth copy of the management table.

At block 394, the control bit associated with the data retrieved is updated with the compliment of the control bit associated with the third copy of the management table.

At block 396, operations are performed on the data retrieved from the management table (e.g., OP-VL management table 208). For example, the head and tail pointers for a corresponding OP-VL request queue may be updated.

At block 398, the updated data is copied to the second copy of the table 304 and the fourth copy of the table 308.

At block 399, the method ends.

The present description may be implemented not only within a physical circuit (e.g., on semiconductor chip) but also within machine-readable media. For example, the circuits and designs discussed above may be stored upon and/or embedded within machine-readable media associated with a design tool used for designing semiconductor devices. Examples include a netlist formatted in the VHSIC Hardware Description Language (VHDL) language, Verilog language or SPICE language. Some netlist examples include: a behavioral level netlist, a register transfer level (RTL) netlist, a gate level netlist and a transistor level netlist. Machine-readable media also include media having layout information such as a GDS-II file. Furthermore, netlist files or other machine-readable media for semiconductor chip design may be used in a simulation environment to perform the methods of the teachings described above.

Thus, it is also to be understood that embodiments of this invention may be used as or to support a software program executed upon some form of processing core (such as the CPU of a computer) or otherwise implemented or realized upon or within a machine-readable medium. A machine-readable medium includes any mechanism for storing or transmitting information in a form readable by a machine (e.g., a computer). For example, a machine-readable medium includes read only memory (ROM); random access memory (RAM); magnetic disk storage media; optical storage media; flash memory devices; electrical, optical, acoustical or other form of propagated signals (e.g., carrier waves, infrared signals, digital signals, etc.); etc.

Thus, method and system to manage resource requests within an arbiter associated with an interconnect device, have been described. Although the present invention has been described with reference to specific exemplary embodiments, it will be evident that various modifications and changes may be made to these embodiments without departing from the broader spirit and scope of the invention. Accordingly, the specification and drawings are to be regarded in an illustrative rather than a restrictive sense.

What is claimed is:

1. A method, comprising:
   receiving a request through one of a plurality of pipelines to read a data record, wherein four separate copies of the data record are stored at four interconnected memories;
   identifying the pipeline through which the data request was received;
   identifying control information associated with each of the four copies of the requested data record;
   analyzing the identified pipeline and identified control information to determine based on the control information which of the four interconnected memories contains the most accurate copy of the data record; and
   reading the copy of the data record determined to be the most accurate.

2. The method of claim 1 wherein the four interconnected memories comprise four interconnected RAMs.

3. The method of claim 1 wherein the plurality of pipelines comprises a first pipeline and a second pipeline.

4. The method of claim 3 wherein the control information comprises one bit of information, wherein the one bit is equal to 0 or 1.

5. The method of claim 4 wherein analyzing comprises determining that the most accurate copy of the data record is the copy contained in the first of the four interconnected memories when the read request is received via the first pipeline and the combination of the control bits associated with the data records in the first and second interconnected memories are 00 or 11.

6. The method of claim 4 wherein analyzing comprises determining that the most accurate copy of the data record is the copy contained in the second of the four interconnected memories when the read request is received via the first pipeline and the combination of the control bits associated with the data records in the first and second interconnected memories are 01 or 10.

7. The method of claim 4 wherein analyzing comprises determining that the most accurate copy of the data record is the copy contained in the third of the four interconnected memories when the read request is received via the second pipeline and the combination of the control bits associated with the data records in the third and fourth interconnected memories are 01 or 10.

8. The method of claim 4 wherein analyzing comprises determining that the most accurate copy of the data record is the copy contained in the fourth of the four interconnected memories when the read request is received via the second pipeline and the combination of the control bits associated with the data records in the third and fourth interconnected memories are 01 or 10.

9. The method of claim 3 further comprises updating the control information associated with two of the four separate copies of the data record after the requested data is read.

10. The method of claim 9 comprises updating the control information associated with the first and third interconnected memories if the data request was received via the first pipeline.

11. The method of claim 9 comprises updating the control information associated with the second and fourth interconnected memories if the data request was received via the second pipeline.

12. The method of claim 3 further comprises updating contents of two of the four separate copies of the data record after the requested is read.

13. The method of claim 12 comprises updating the contents of the separate copies of the requested data record stored at the first and third interconnected memories if the data request was received via the first pipeline.

14. The method of claim 12 comprises updating the contents of the separate copies of the requested data record stored at the second and fourth interconnected memories if the data request was received via the second pipeline.

15. The method of claim 1 wherein the data record comprises an OP-VL request queue record.

16. The method of claim 3 wherein if the request was received through the first pipeline and there was a previous request to read the data record within the immediately preceding clock cycle then a further determination is made as to whether the previous request was made via the first pipeline or the second pipeline.

17. The method of claim 16 further comprises retrieving the requested data record from a read bypass associated with the second pipeline if the previous request was made via the second pipeline.

18. The method of claim 17 wherein the requested data record retrieved via the second pipeline's read bypass comprises a current copy of the requested data.

19. The method of claim 17 further comprises writing the requested data record back to the first copy of the table and a third copy of the table.

20. The method of claim 16 further comprises retrieving the requested data record from the first pipeline's read bypass if the previous request was made via the first pipeline.

21. The method of claim 3 wherein if the request was received through the second pipeline then a determination is made as to whether there was a previous request to read the data record within the preceding clock cycle.

22. The method of claim 21 wherein if there was a previous request to read the data record within the preceding clock cycle then a determination is made as to whether the previous request was made via the first pipeline or the second pipeline.

23. The method of claim 22 wherein if the previous request is made via the first pipeline then the data record is retrieved from the first pipeline read bypass and a control bit associated with the data record is complemented.

24. The method of claim 23 wherein the data record is written back to the second and fourth copies of the table.

25. The method of claim 3 wherein if the data record is being written in the current clock cycle then a determination as to whether the write was initiated via a request made through the first pipeline.

26. The method of claim 25 wherein if the write was initiated through the first pipeline then the data record is retrieved from the first pipeline's write bypass, wherein if the write was initiated through the second pipeline then the data record is retrieved from the second pipeline's write bypass.

27. The method of claim 26 wherein the retrieve data is written back to the first and third copies of the table.

28. The method of claim 25 wherein if the write was initiated through the second pipeline then data record is retrieved from the second pipeline write bypass, wherein if the write was initiated through the first pipeline then the data record is retrieved from the first pipeline write bypass, wherein a control associated with the data record retrieved through the first pipeline write bypass is complemented.

29. The method of claim 28 wherein the data record is written back to the second and fourth copies of the table.

30. The method of claim 3 wherein if the data record associated with the read request was not read in the immediately preceding clock cycle and is not being written in the current clock cycle then a determination is made as to whether the read request was made via the first pipeline or the second pipeline.

31. The method of claim 30 wherein if the read request was made via the first pipeline then:
a copy of the data record is read from the first copy of the table;
a copy of the data record is read from the second copy of the table;
a control bit associated with the data record from the first copy of the table is identified;
a control bit associated with the data record from the second copy of the table is identified;
a comparison is made between each of the two control bits identified,
wherein if the two control bits are identical then the data record is read from the first copy of the table, otherwise the data record is read from the second copy of the table.

32. The method of claim 31 wherein the control bit associated with the data recode retrieved is updated with the control bit associated with the copy of the data record located in the second copy of the table.

33. The method of claim 32 wherein the data record is written back to the first and third copies of the table.

34. The method of claim 30 wherein if the read request was made via the second pipeline then:
a copy of the data record is read from the third copy of the table;
a copy of the data record is read from the fourth copy of the table;
a control bit associated with the data record from the third copy of the table is identified;
a control bit associated with the data record from the fourth copy of the table is identified;
a comparison is made between each of the two control bits identified,
wherein if the two control bits are identical then the data record is read from the third copy of the table, otherwise the data record is read from the fourth copy of the table.

35. The method of claim 34 wherein the control bit associated with the data recode retrieved is updated with the complement of the control bit associated with the copy of the data record located in the third copy of the table.

36. The method of claim 35 wherein the data record is written back to the second and fourth copies of the table.

37. An apparatus to provide simultaneous access via multiple pipelines to a table, the system including:
a plurality of interconnected memories, wherein each maintains a copy of the table;
a plurality of pipelines coupled to provide read access and write access to the plurality of interconnected memories;
a plurality of read bypasses coupled to provide access to a current state of a data record within the table in response to a request to read the data record, wherein the data record was read in the immediately preceding clock cycle; and
a plurality of write bypasses coupled to provide access to a current state of a data record within the table in response to a request to read the data record, wherein the data record is being written in the current clock cycle.

38. The apparatus of claim 37 further comprises a plurality of multiplexers.

39. The apparatus of claim 37 wherein the plurality of pipelines comprises a first and a second pipeline.

40. The apparatus of claim 37 wherein the data record comprises an OP-VL request queue record.

41. A memory device to allow simultaneous access via multiple pipelines to a table, the memory device include:
a means to store and maintain four copies of a table, wherein the table contains a plurality of data record;
a means to access each of the four copies of the table;
a means to provide access to a current state of a data record within the table in response to a request to read the data record, wherein the data record was read in the immediately preceding clock cycle; and
a means to provide access to a current state of a data record within the table in response to a request to read the data record, wherein the data record is being written in the current clock cycle.

42. A memory device included within a network switch, the memory device including:
a plurality of interconnected memories wherein each maintaining a copy of a table;
a plurality of pipelines coupled to provide read access and write access to the plurality of interconnected memories;

- a plurality of read bypasses coupled to provide access to a current state of a data record within the table in response to a request to read the data record, wherein the data record was read in the immediately preceding clock cycle; and
- a plurality of write bypasses coupled to provide access to a current state of a data record within the table in response to a request to read the data record, wherein the data record is being written in the current clock cycle.

43. A queue management system to manage resource requests within an arbiter associated with an interconnect device, the queue management system including:
- a plurality of interconnected memories, associated with the arbiter, each of the plurality of memories to maintain a copy of a queue system management table;
- a plurality of read and write ports to access data records in the queue system management table; and
- a plurality of data bypasses to provide access to the most current copy of a data record within the queue system management, wherein the data record has been accessed in the immediately preceding clock cycle or the data record is being written in the current clock cycle.

44. The queue management system of claim 43 further comprises identifying which of the plurality of the memories queue management table has a most current copy of the data record requested.

45. The queue management system of claim 43 further comprises a control bit field within each of the data records.

46. The queue management system of claim 45 wherein the control bit in each copy of a specific record is utilizes to determine which copy of the specific record is current.

47. The queue management system of claim 46 wherein the determination is dependent on which of the plurality of pipelines receives the access request.

48. The queue management system of claim 43 wherein the plurality of data bypasses includes read bypasses and write bypasses.

49. The queue management system of claim 48 wherein the read bypasses provide access to a data record retrieved in the immediately preceding clock cycle.

50. The queue management system of claim 48 wherein the write bypasses provide access to a data record being written in the current clock cycle.

* * * * *

UNITED STATES PATENT AND TRADEMARK OFFICE
CERTIFICATE OF CORRECTION

PATENT NO. : 6,976,142 B1
APPLICATION NO. : 10/431974
DATED : December 13, 2005
INVENTOR(S) : Richard L Schober It is certified that error appears in the above-identified patent and that said Letters Patent is hereby corrected as shown below:

Col. 14, Line 17 in Claim 7, delete "01 or 10." and insert --00 or 11.--, therefor.

Col. 14, Line 39 in Claim 12, after "requested" insert --data--.

Col. 15, Line 54 in Claim 31, after "record" insert --read--.

Col. 15, Line 56 in Claim 31, after "record" insert --read--.

Col. 15, Line 65 in Claim 32, delete "recode" and insert --record--, therefor.

Col. 16, Line 9 in Claim 34, after "record" insert --read--.

Col. 16, Line 11 in Claim 34, after "record" insert --read--.

Col. 16, Line 20 in Claim 35, delete "recode" and insert --record--, therefor.

Col. 16, Line 45 in Claim 39, after "first" insert --pipeline--.

Col. 16, Line 49 in Claim 41, delete "include:" and insert --including:--, therefor.

Col. 16, Line 51 in Claim 41, delete "record;" and insert --records;--, therefor.

UNITED STATES PATENT AND TRADEMARK OFFICE
CERTIFICATE OF CORRECTION

PATENT NO. : 6,976,142 B1
APPLICATION NO. : 10/431974
DATED : December 13, 2005
INVENTOR(S) : Richard L Schober It is certified that error appears in the above-identified patent and that said Letters Patent is hereby corrected as shown below:

Col. 16, Line 63 in Claim 42, after "memories" insert --,--.

Col. 16, Line 64 in Claim 42, delete "maintaining" and insert --maintains--, therefor.

Col. 18, Line 8 in Claim 46, delete "utilizes" and insert --utilized--, therefor.

Signed and Sealed this

Seventh Day of July, 2009

JOHN DOLL
*Acting Director of the United States Patent and Trademark Office*